(12) United States Patent
Ghannam et al.

(10) Patent No.: US 10,285,880 B1
(45) Date of Patent: May 14, 2019

(54) WHEELCHAIR DOCK

(71) Applicant: Ford Global Technologies, LLC, Dearborn, MI (US)

(72) Inventors: Mahmoud Yousef Ghannam, Canton, MI (US); Swadad A. Carremm, Canton, MI (US); Dana Conner, Southfield, MI (US); Clara Bennie, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 30 days.

(21) Appl. No.: 15/808,594

(22) Filed: Nov. 9, 2017

(51) Int. Cl.
| B60N 2/02 | (2006.01) |
| A61G 3/08 | (2006.01) |
| B60P 7/08 | (2006.01) |

(52) U.S. Cl.
CPC .......... *A61G 3/0808* (2013.01); *B60P 7/0892* (2013.01)

(58) Field of Classification Search
CPC ............................ A61G 3/0808; B60P 7/0892
See application file for complete search history.

(56) References Cited

U.S. PATENT DOCUMENTS

| 4,805,954 | A | 2/1989 | Lazaroff |
| 4,973,022 | A | 11/1990 | Mayland |
| 6,821,078 | B2 | 11/2004 | Dudai et al. |
| 8,926,254 | B2 * | 1/2015 | Pocobello ............. A61G 3/061 414/537 |
| 9,061,655 | B2 | 6/2015 | Verachtert |
| 9,333,129 | B2 * | 5/2016 | Cardona ............... B60P 7/0823 |
| 10,059,383 | B2 * | 8/2018 | Pelletier ................ A61G 3/061 |
| 2005/0214090 | A1 | 9/2005 | Girardin et al. |
| 2017/0231844 | A1 | 8/2017 | Gale |
| 2017/0296405 | A1 * | 10/2017 | Clevenger ............. A61G 3/066 |

FOREIGN PATENT DOCUMENTS

| CA | 2379256 A1 * | 2/2001 | ............ A61G 3/061 |
| DE | 102009021777 A1 | 11/2010 | |
| WO | 2016048154 A1 | 3/2016 | |

* cited by examiner

*Primary Examiner* — Lori L Lyjak
(74) *Attorney, Agent, or Firm* — Frank A. MacKenzie; Bejin Bieneman PLC (57) ABSTRACT

A wheelchair-dock system includes a floor including an elongated depression, a movable member, an actuator drivingly coupled to the member, and a position sensor coupled to the member. The depression defines a lateral direction. The member is movable in the lateral direction between an extended position over the depression and a retracted position.

20 Claims, 9 Drawing Sheets

WHEELCHAIR DOCK

BACKGROUND

Passenger vehicle are not typically designed and produced to accommodate wheelchairs. Therefore, accommodations for wheelchairs in vehicles are typically installed with aftermarket modifications to a production vehicle. For example, a vehicle may be modified with a lift or the like to load a wheelchair onto a vehicle. Often, a wheelchair will be stowed in a cargo area once a passenger is transferred to a vehicle seat. Production vehicles typically do not have the ability to accommodate the wheelchair of an occupant in a manner allowing the occupant to sit in the wheelchair in the vehicle, or if they do, significant aftermarket modification is required.

DETAILED DESCRIPTION

A wheelchair-dock system includes a floor including an elongated depression, a member, an actuator drivingly coupled to the member, and a position sensor coupled to the member. The depression defines a lateral direction. The member is movable in the lateral direction between an extended position over the depression and a retracted position.

The member in the extended position may extend completely across the depression. The member in the extended position may extend above more than half of a projected area above the depression.

The actuator may be a motor. The wheelchair-dock system may further include a belt coupling the motor and the member.

The actuator may be a solenoid.

The depression may include a side wall having a hole, and the member in the extended position may extend through the hole. The member may be a first member, and the wheelchair-dock system may include a second member movable in the lateral direction between the retracted position and the extended position over the depression. The side wall may be a first side wall, the hole may be a first hole, the depression may include a second side wall having a second hole, and the second member in the extended position may extend through the second hole.

The member may include a base member and a plurality of finger members movable in the lateral direction relative to the base member. The member may include a plurality of springs, each connected to the base member and one of the finger members. Each finger member may be movable relative to the base member between a relaxed position in which the corresponding spring is relaxed and a contracted position in which the corresponding spring is compressed.

The wheelchair-dock system may further include a control module in communication with the position sensor, an inflator in communication with the control module, and an airbag fluidly connected to the inflator, and the control module may be programmed to instruct the inflator to discharge based on the member being in an engaged position away from the retracted position.

The wheelchair-dock system may further include a control module in communication with the position sensor, an inflator in communication with the control module, and an airbag fluidly connected to the inflator, and the control module may be programmed to instruct the inflator to discharge more slowly than a default discharging speed.

The floor may include a floor panel, and the depression may include a curved panel and two side walls extending from the curved panel to the floor panel.

The depression may be sized to receive a wheelchair wheel.

The wheelchair-dock system may further include a vehicle including a passenger cabin, and the floor may be disposed in the passenger cabin. The depression may be positioned relative to the passenger cabin so that a wheelchair engaged with the depression is in a driver position.

A wheelchair-dock system includes a floor including an elongated depression, means for preventing movement of a wheelchair wheel in the depression, and means for covering the depression. The means for preventing movement of the wheelchair wheel and the means for covering the depression are the same means.

The wheelchair-dock system may further include means for reporting a status of the means for preventing movement of the wheelchair wheel and covering the depression.

As shown in the Figures, a wheelchair-dock system for a vehicle 30 includes a floor 42 including an elongated depression 46, a movable member 56, an actuator 70 drivingly coupled to the member 56, and a position sensor 82 coupled to the member 56. The depression 46 defines a lateral direction L. The member 56 is movable in the lateral direction L between an extended position over (i.e., covering) the depression 46 and a retracted position.

The wheelchair-dock system can make traveling in a vehicle 30 easier for occupants who use a wheelchair 38. The depressions 46 help position the wheelchair 38 within a passenger cabin 34 of the vehicle 30. The wheelchair-dock system deploys the member 56 when the wheelchair 38 is in the vehicle 30, and when it is not; i.e., the member 56 is provided both for covering the depressions 46 and for locking a wheel 48 of the wheelchair 38 in place while the vehicle 30 is in motion. The wheelchair-dock system may help keep the occupant secure during an impact, e.g., by preventing the wheelchair 38 from tipping over, preventing the occupant from sliding under a seatbelt, etc. The wheelchair-dock system may be installed during production of the vehicle 30.

Figure 1:
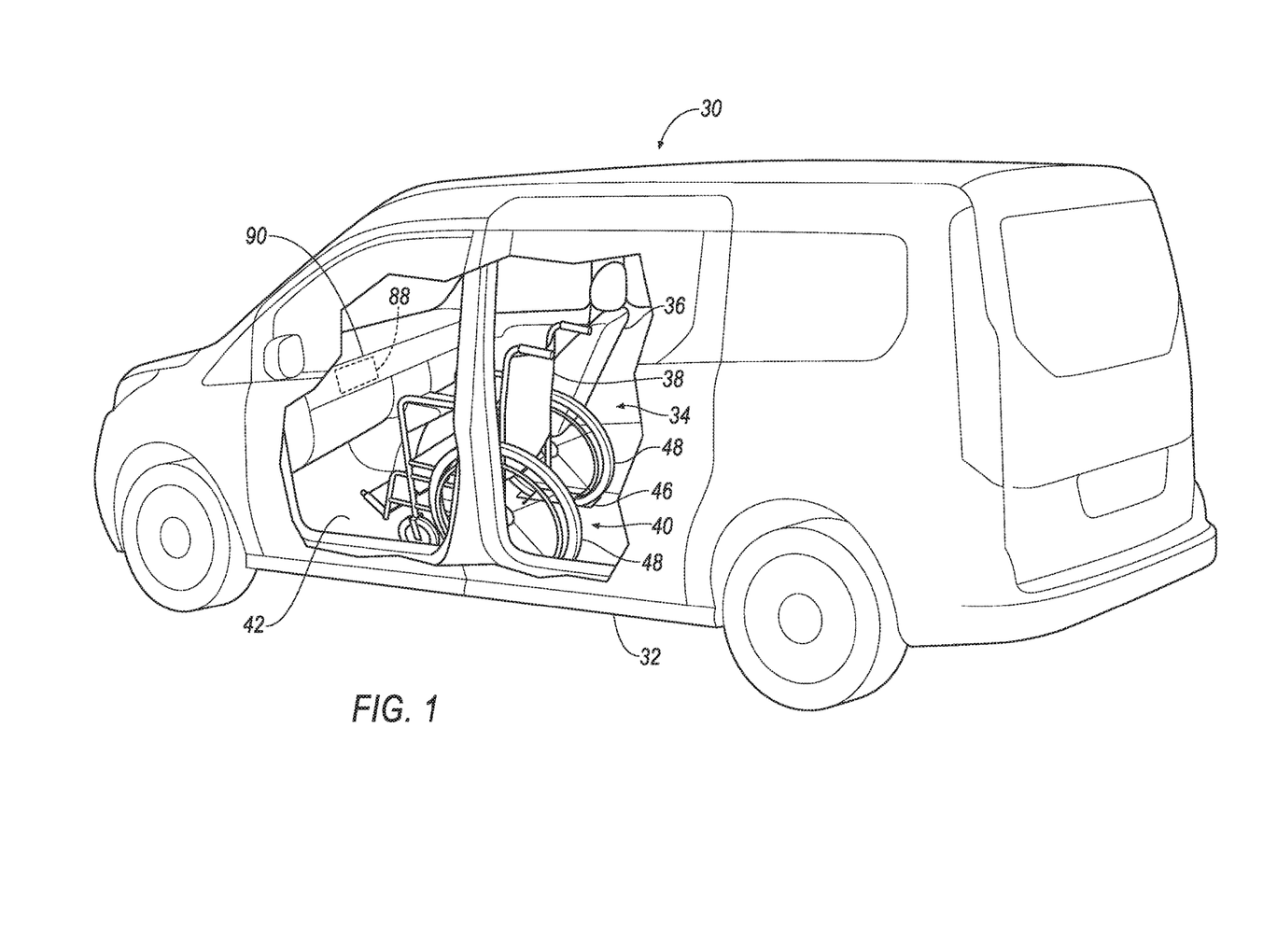
FIG. 1 is a perspective view of an example vehicle.

With reference to FIG. 1, the vehicle 30 includes a body 32. In one example, the vehicle 30 may be of a unibody construction, in which a frame and a body 32 of the vehicle 30 are a single component. The body 32 may be formed of any suitable material, for example, steel, aluminum, etc.

Figure 2:
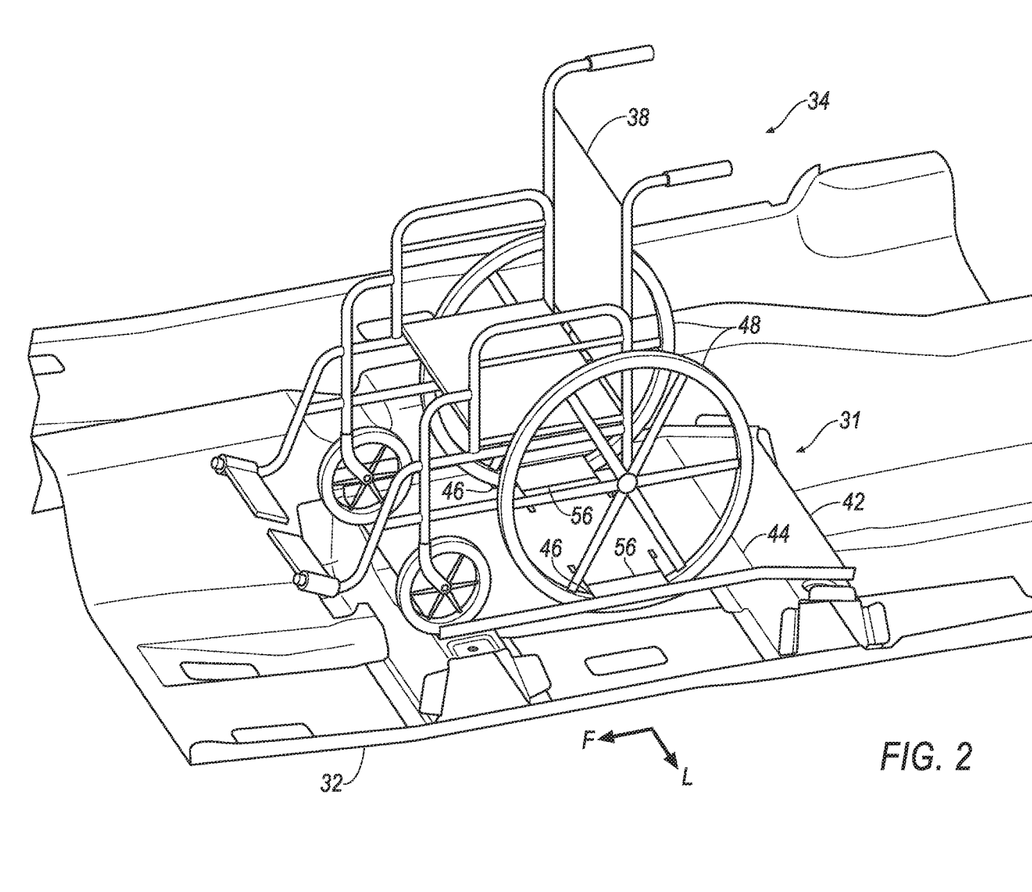
FIG. 2 is a perspective view of a lower frame of a vehicle including a wheelchair dock with wheelchair wheel rims included for illustration.

The vehicle 30 includes the passenger cabin 34 to house occupants, if any, of the vehicle 30. The passenger cabin 34 is at least partially enclosed by the body 32. The passenger cabin 34 includes seats 36, including one or more front seats 36 disposed at a front of the passenger cabin 34, and one or more back seats 36 disposed behind the front seats 36. The passenger cabin 34 may also include other seats 36, such as third-row seats (not shown) at a rear of the passenger cabin 34. The passenger cabin 34 includes a space 40 that is lacking a seat 36 and that is large enough for the wheelchair 38 to occupy. The space 40 may be positioned within the passenger cabin 34 in a driver position, i.e., the location in the passenger cabin 34 in which the driver of the vehicle 30 sits, as shown in FIG. 2. Alternatively or additionally, the space 40 may be positioned toward a rear of the passenger cabin 34.

With reference to FIG. 2, the passenger cabin 34 includes the floor 42. The floor 42 may be fixed to the body 32. The floor 42 is positioned at a bottom of the passenger cabin 34. The floor 42 includes a floor panel 44, which is a broad flat panel on which occupants can step, roll a wheelchair 38, etc.

The floor 42 includes two depressions 46. Each depression 46 extends downwardly from the floor panel 44. Each depression 46 is sized to receive a wheelchair wheel 48, and the depressions 46 are spaced apart at approximately the typical distance between two wheels 48 of a wheelchair 38. The depressions 46 may be located in the space 40. The depressions 46 may be positioned relative to the passenger cabin 34 so that a wheelchair 38 engaged with the depressions 46, i.e., with wheels 48 in the depressions 46, is in the driver position.

With reference to FIGS. 3-9 and 12, each depression 46 is elongated in a direction, i.e., are longer in that direction than in a perpendicular direction. The two depressions 46 are elongated in parallel in a direction. Each depression 46 may be elongated in a vehicle-forward direction F. The direction F is typically a direction along longitudinal axis of the vehicle 30, i.e., a direction along what would conventionally be referred to as the length of the vehicle 30. The depression 46 defines the lateral direction L, i.e., a sideways, direction relative to the depression 46. Typically the direction L is a direction perpendicular to the longitudinal axis of the vehicle 30, i.e., a direction along what would conventionally be referred to as the width of the vehicle 30. The lateral direction L may be a vehicle-left or -right direction. The example arrow in FIG. 2 shows the direction L as a vehicle-left direction.

Each depression 46 may include a curved panel 50 and two side walls 52 extending from the curved panel 50 to the floor panel 44. The curved panel 50 may be elongated along an arc and may curve downward from the floor panel 44 and back upward to the floor panel 44. The curved panels 50 may be oriented in the vehicle-forward direction F, i.e., elongated along the vehicle-forward direction F. The lateral direction L is the direction that the side walls 52 face, perpendicular to the direction of elongation of the curved panel 50.

Figure 3:
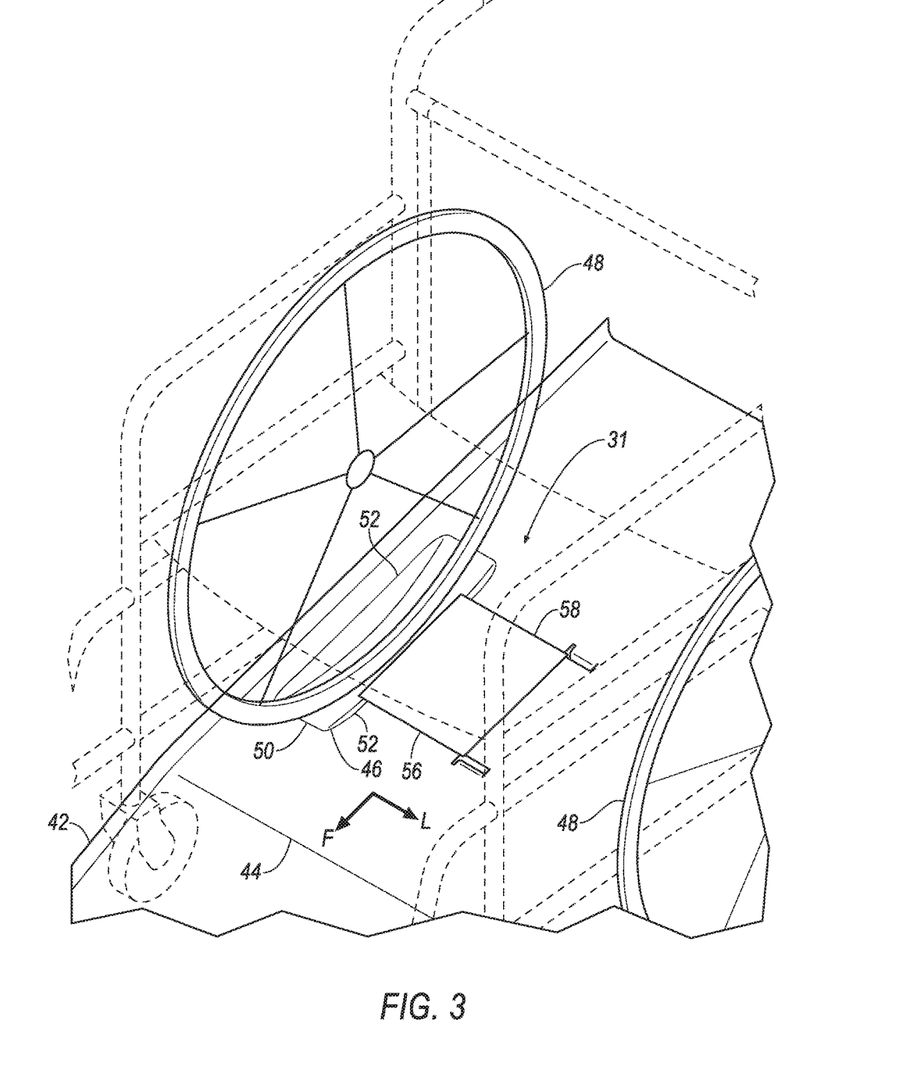
FIG. 3 is a perspective view of a portion of a floor of the vehicle with an example member in a retracted position and with a wheelchair wheel included for illustration.
Figure 6:
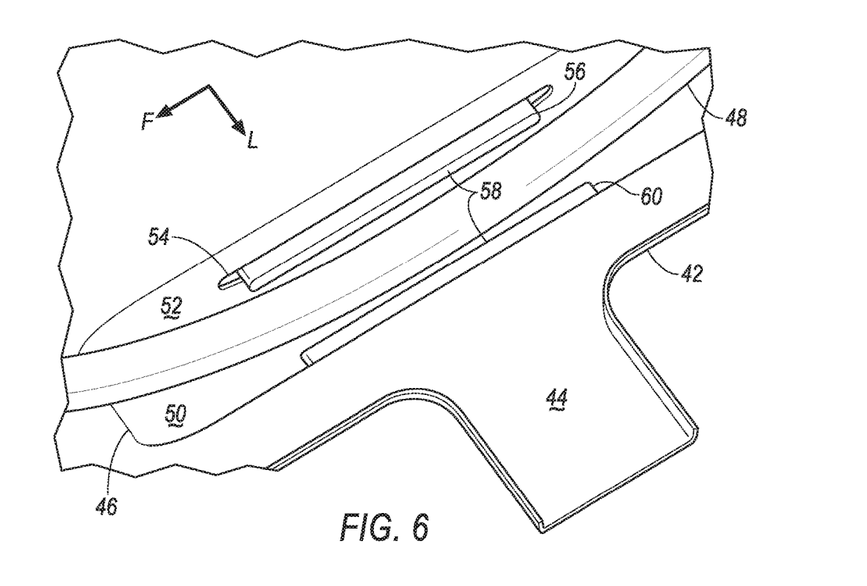
FIG. 6 is a perspective view of a portion of the floor with another example member in the retracted position and with a wheelchair wheel included for illustration.
Figure 7:
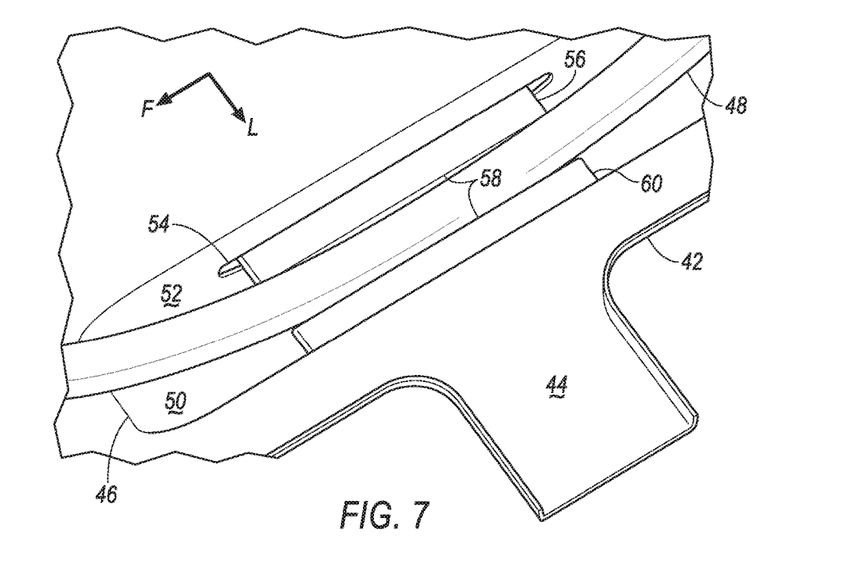
FIG. 7 is a perspective view of the portion of the floor with the member in an engaged position and with the wheelchair wheel included for illustration.
Figure 8:
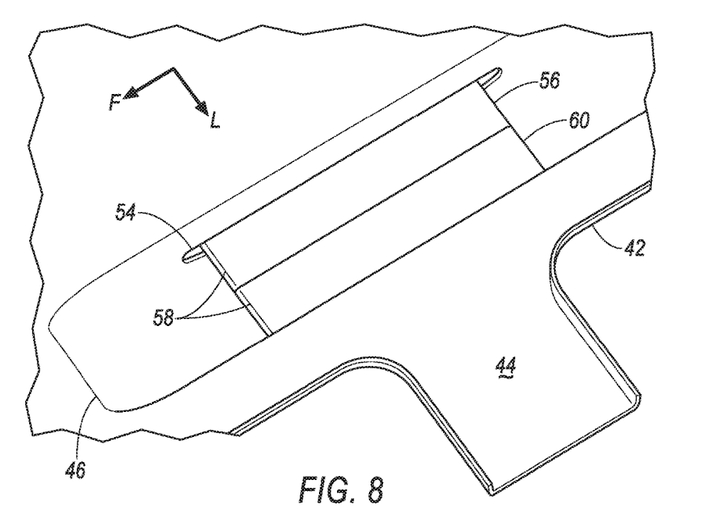
FIG. 8 is a perspective view of the portion of the floor with the member in the extended position.

As shown in FIG. 3, the side walls 52 may be solid. Alternatively, as shown in FIGS. 6-8, one or both of the side walls 52 for each depression 46 may include a hole 54. The holes 54 may provide access to an underside of the floor 42.

With continued reference to FIGS. 3-9 and 12, the member 56 provides means for preventing movement of the wheel 48 of the wheelchair 38 in the depression 46, and the member 56 provides means for covering the depression 46. The member 56 is movably coupled to the floor 42 for each depression 46. The member 56 may be positioned on a top side of the floor panel 44, as shown in FIGS. 2-5 and 12, or the member 56 may be positioned on an underside of the floor panel 44, as shown in FIGS. 6-9. The member 56 may be movable just above one of the depressions 46, as shown in FIGS. 2-5 and 12, or the member 56 may be movable through the depression 46 below the floor panel 44, as shown in FIGS. 6-9.

The member 56 is movable in the lateral direction L between different positions. The member 56 is movable to a retracted position, as shown in FIGS. 3 and 6. The member 56 in the retracted position exposes a majority of the projected area above the depression 46, i.e., the area of the floor panel 44 occupied by the depression 46.

Figure 4:
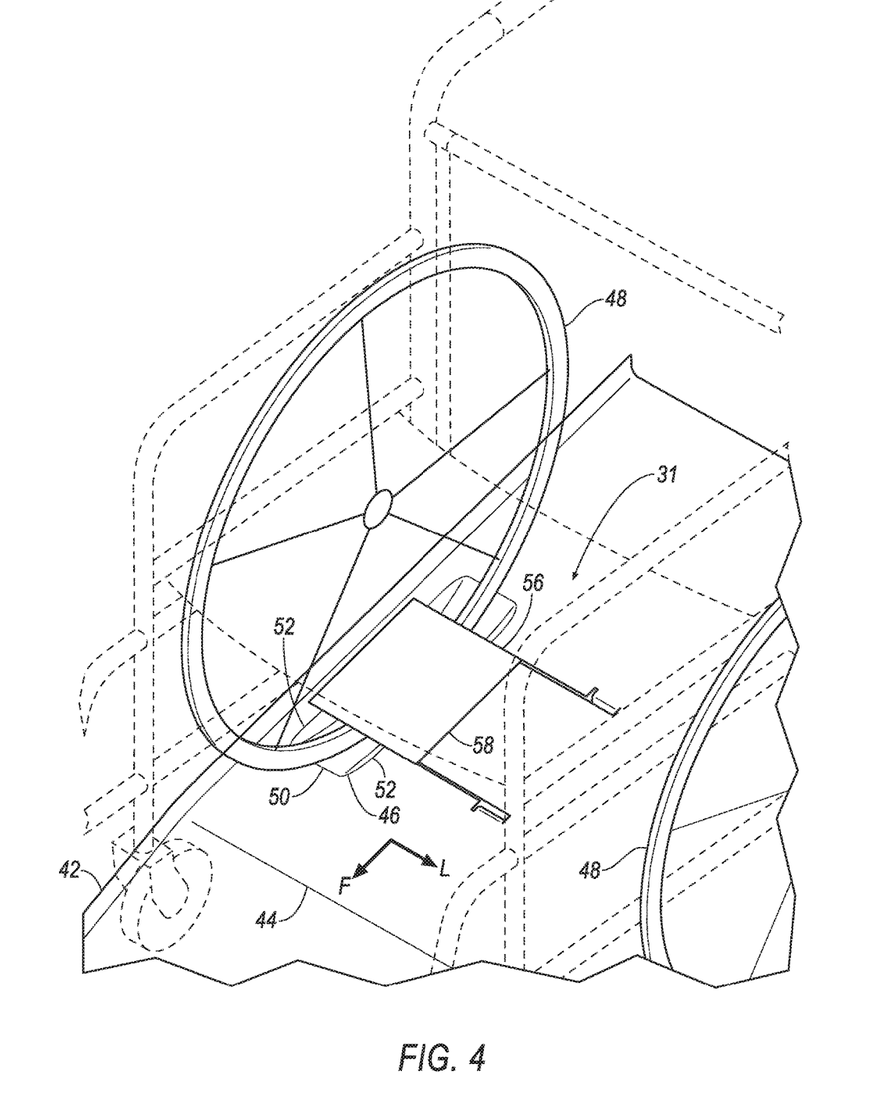
FIG. 4 is a perspective view of the portion of the floor of the vehicle with the member in an extended position and with the wheelchair wheel included for illustration.

The member 56 is movable to an extended position, as shown in FIGS. 4 and 8. The member 56 in the extended position extends over the depression 46. The member 56 in the extended position may extend completely across the depression 46. For the purposes of this disclosure, and, it is believed, consistent with at least one plain and ordinary meaning of the term, "across" is defined as an extent from one side of something to the other side of the something. The member 56 in the extended position may extend above more than half of the projected area above the depression 46. The member 56 in the extended position typically allows an occupant of the vehicle 30 to step on the depression 46 as on the floor panel 44.

Figure 12:
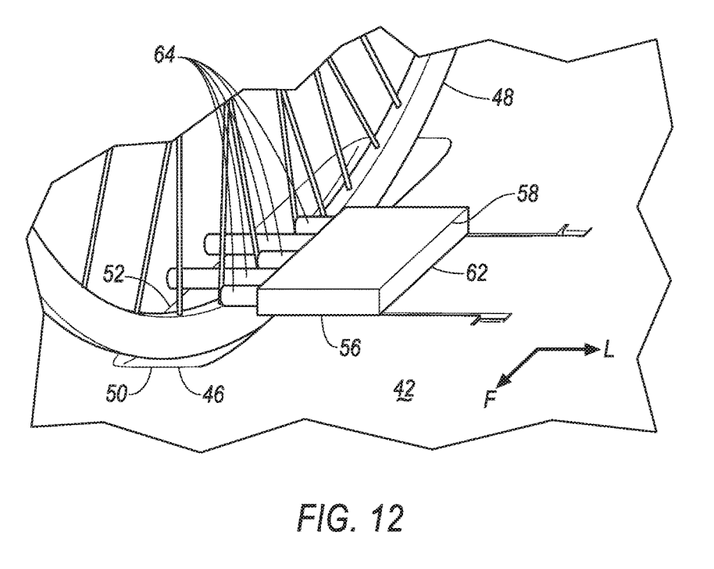
FIG. 12 is a perspective view of a portion of the floor including the member in an extended position.

The member 56 is movable to an engaged position, as shown in FIGS. 4, 7, and 12. The engaged position is away from the retracted position. The engaged position may be the same as the extended position, as shown in FIG. 4, or the engaged position may be away from the extended position, as shown in FIG. 7. The member 56 in the engaged position securely holds the wheel 48 of the wheelchair 38.

The member 56 extends in the vehicle-forward direction F and the lateral direction L and is shorter vertically than in the vehicle-forward direction F and lateral direction L. The member 56 has a generally flat top surface 58. The top surface 58 may be parallel to the floor panel 44. A cross-section of the member 56 along a plane perpendicular to the lateral direction L may be shaped to fit through the holes 54, if present.

With reference to FIGS. 6-9, the member 56 may be a first member 56, and a second member 60 may be movable in the lateral direction L. The first member 56 and the second member 60 may each extend through one of the holes 54 in one of the side walls 52 of the depression 46. The first member 56 and second member 60 may be movable between the retracted position, the engaged position, and the extended position. The first member 56 and the second member 60 in the extended positions may contact each other.

Figure 10:
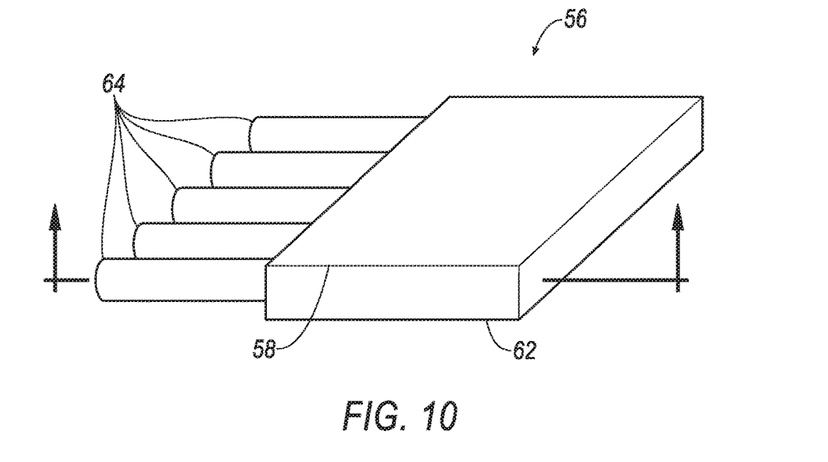
FIG. 10 is a perspective view of another example member.
Figure 11:
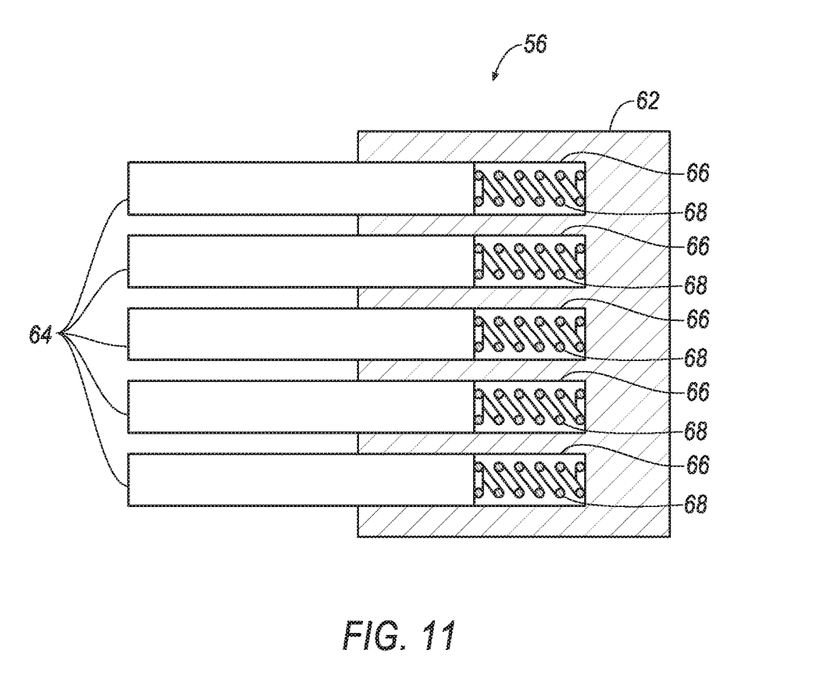
FIG. 11 is a cross-sectional view of the member.

With reference to FIGS. 10-12, the member 56 may include a base member 62 and a plurality of finger members 64 movable in the lateral direction L relative to the base member 62. The finger members 64 may be elongated in the lateral direction L. The base member 62 may include a plurality of tunnels 66 elongated in the lateral direction L. Each of the finger members 64 may be disposed in one of the tunnels 66. The member 56 may include a plurality of springs 68. Each spring 68 is connected to the base member 62 and one of the finger members 64. The springs 68 may be compression springs. Each spring 68 may be disposed in one of the tunnels 66. Each finger is movable relative to the base member 62 between a relaxed position in which the corresponding spring 68 is relaxed and a contracted position in which the corresponding spring 68 is depressed. FIG. 12 shows three of the finger members 64 contacting spokes of the wheel 48 of the wheelchair 38 and being pushed into the contracted position and two of the finger members 64 extending between the spokes and in the relaxed position.

Figure 5:
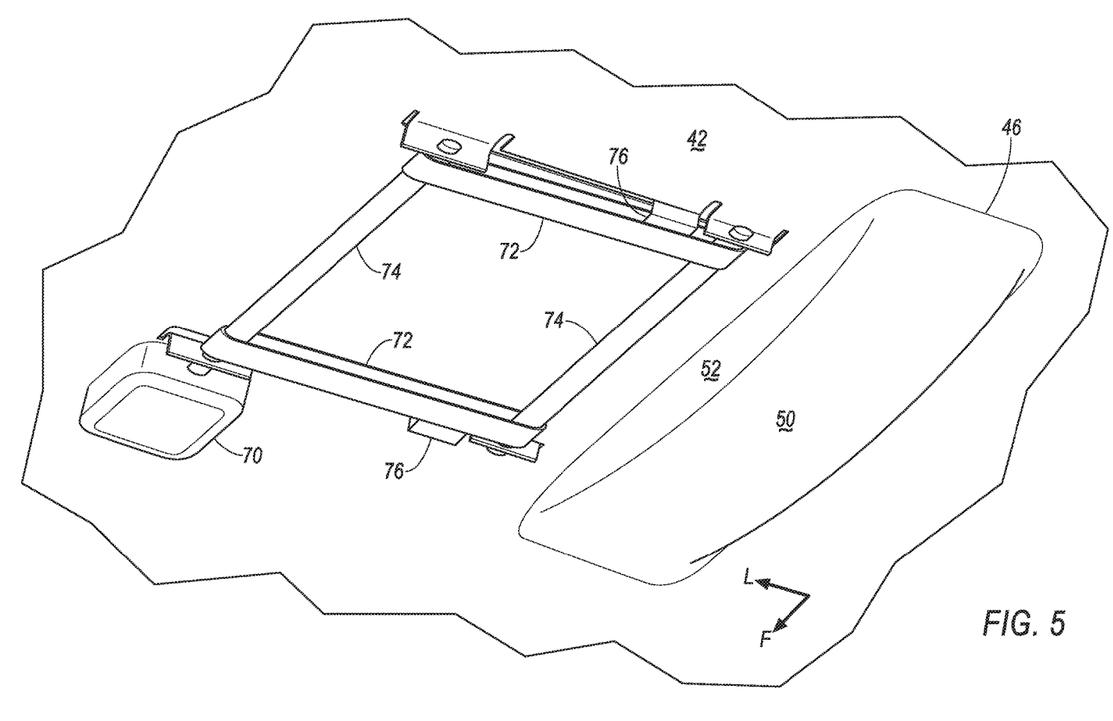
FIG. 5 is an underneath perspective of the portion of the floor.
Figure 9:
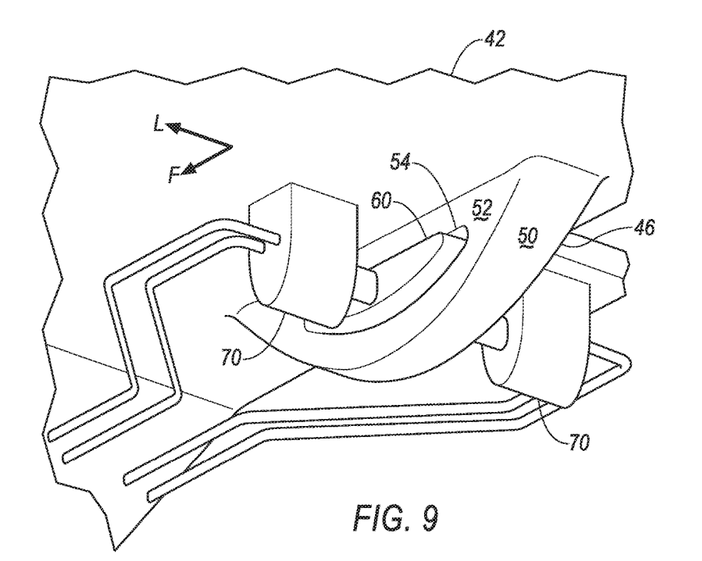
FIG. 9 is an underneath perspective view of the portion of the floor.

With reference to FIGS. 5 and 9, the actuator 70 is drivingly coupled to each member 56. The actuator 70 may be a motor, such as an electric motor, as shown in FIG. 5. The motor is able to impart rotational motion. The actuator 70 may be a solenoid, as shown in FIG. 9. The solenoid is able to impart linear motion.

With reference to FIG. 5, one or more belts 72 may couple the actuator 70 to the member 56. The belts 72 may extend around two rollers 74. One of the rollers 74 may be rotatingly coupled to the actuator 70. The member 56 may include one or more tabs 76 that are attached to the belts 72. As the motor rotates the roller, the belts 72 pull the tabs 76 and thus the member 56 along the lateral direction L between the retracted and extended positions.

With reference to FIG. 9, the actuators 70 are each drivingly coupled to one of the first member 56 and the second member 60. The actuators 70 may linearly move the first member 56 and the second member 60. The actuators 70 may be electronically coupled so as to move the first member 56 and the second member 60 together, i.e., to the retracted position, engaged position, and extended position at the same time.

Figure 13:
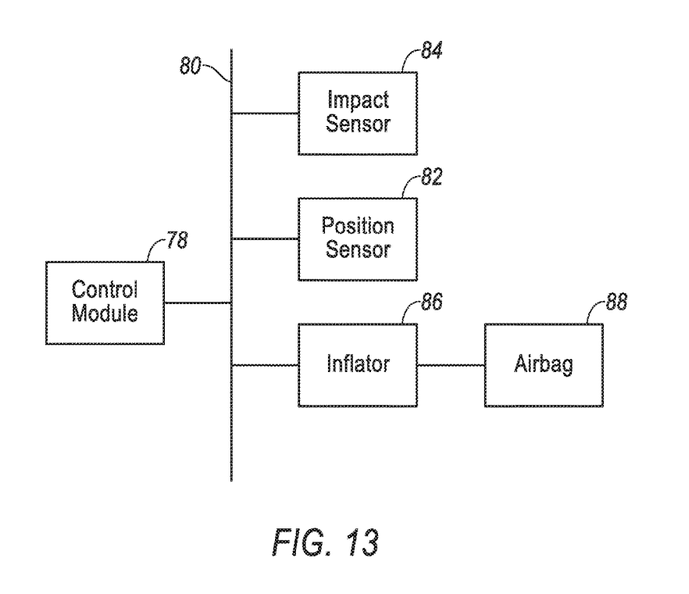
FIG. 13 a block diagram of an example control system monitoring the wheelchair dock.

With reference to FIG. 13, the vehicle 30 includes a control module 78. The control module 78 is a microprocessor-based controller. The control module 78 may include a processor, memory, etc. The memory of the control module 78 may include memory for storing instructions executable by the processor as well as for electronically storing data and/or databases. The control module 78 may be a restraint control module (RCM) and may be in communication with and may control airbags, pretensioners, etc. in the vehicle 30, among other functions.

The control module 78 may transmit and receive data through a communications network 80 such as a controller area network (CAN) bus, Ethernet, WiFi, Local Interconnect Network (LIN), onboard diagnostics connector (OBD-II), and/or by any other wired or wireless communications network. The control module 78 may be in communication with the position sensor 82, an impact sensor 84, an inflator 86, and other components via the communications network 80.

The position sensor 82 provides means for reporting a status, e.g., a position (e.g., retracted or extended), of the member 56. The position sensor 82 may be coupled to the member 56. The position sensor 82 may be fixed relative to the member 56 and movable with the member 56, or the position sensor 82 may be fixed relative to the floor 42 and indirectly coupled to the member 56. The position sensor 82 may be any sensor providing an output that can be mapped to a linear position of the member 56 in the lateral direction L, e.g., a capacitive transducer, a capacitive displacement sensor, an eddy-current sensor, an ultrasonic sensor, a Hall effect sensor, an inductive noncontact position sensor, a linear variable differential transformer, a piezoelectric transducer, a potentiometer, a proximity sensor, a linear coder, a string potentiometer, etc.

The impact sensor 84 is adapted to detect an impact to the vehicle 30. The impact sensor 84 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 84 may be located at numerous points in or on the vehicle 30.

The inflator 86 may be connected to an airbag 88. Upon receiving a signal from, e.g., the control module 78, the inflator 86 may inflate the airbag 88 with an inflatable medium, such as a gas. The inflator 86 may be, for example, a pyrotechnic inflator that uses a chemical reaction to drive inflation medium to the airbag 88. The inflator 86 may be of any suitable type, for example, a cold-gas inflator.

With reference to FIGS. 1 and 13, the airbag 88 is fluidly connected to the inflator 86. For the purposes of this disclosure, "fluidly connected" means permitting a fluid medium to pass between the components. The airbag 88 may be inflatable from an uninflated position to an inflated position. The airbag 88 in the uninflated position may be in, e.g., an instrument panel 90 of the vehicle 30, and the airbag 88 in the inflated position may extend rearward from the instrument panel 90.

The airbag 88 may be formed of any suitable airbag material, for example, a woven polymer. For example, the airbag 88 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The control module 78 may be programmed to instruct the inflator 86 to discharge based on receiving data from the impact sensor 84 indicating an impact to the vehicle 30 and based on receiving data from the position sensor 82 indicating that the member 56 is in the engaged position. Thus, the airbag 88 inflates during an impact only when a wheelchair 38 holding an occupant is engaged with the depressions 46.

The control module 78 may be programmed to instruct the inflator 86 to discharge more slowly than a default discharging speed. A discharging speed is a rate of volume increase for the airbag 88. The default discharging speed may be a discharging speed used by default assuming that an able-bodied occupant is in a seat 36 immediately behind the airbag 88.

A process for utilizing the system 31 can begin when an occupant in a wheelchair 38 enters the vehicle 30, and the member 56 begins in the extended position. The occupant instructs the actuator 70 via a human machine interface (HMI) which could be an application on a smartphone in communication with a vehicle computer, a button on a key fob, a physical switch or the like (not shown), etc., to move the member 56 to the retracted position. When the member 56 is in the retracted position, the occupant moves the wheelchair 38 so that the wheels 48 are positioned in the depressions 46. The occupant then instructs the actuator 70 to move the member 56 to the engaged position. The member 56 in the engaged position prevents the wheels 48 of the wheelchair 38 from leaving the depressions 46 while, e.g., the vehicle 30 is in motion. When the occupant wishes to exit the vehicle 30, the occupant instructs the member 56 to move to the retracted position, and the occupant moves the wheelchair 38 away from the depressions 46 and out of the vehicle 30.

In the event of an impact, the impact sensor 84 may detect the impact and transmit a signal through the communications network 80 to the control module 78. The control module 78 checks the data received from the position sensor 82 to determine whether the member 56 is in the engaged position. If so, the control module 78 may transmit a signal through the communications network 80 to the inflator 86. The inflator 86 may discharge and inflate the airbag 88 at a rate slower than the default discharging speed.

Computing devices as discussed herein, e.g., the control module 78, may be implemented using circuits, chips, etc., as are known. Such computing devices generally include instructions stored in a memory, and executable by a processor, each of these included in the computing device. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A wheelchair-dock system comprising:
   a floor including an elongated depression, the depression defining a lateral direction;
   a member movable in the lateral direction between an extended position over the depression and a retracted position;
   an actuator drivingly coupled to the member; and
   a position sensor coupled to the member.

2. The wheelchair-dock system of claim 1, wherein the member in the extended position extends completely across the depression.

3. The wheelchair-dock system of claim 2, wherein the member in the extended position extends above more than half of a projected area above the depression.

4. The wheelchair-dock system of claim 1, wherein the actuator is a motor.

5. The wheelchair-dock system of claim 4, further comprising a belt coupling the motor and the member.

6. The wheelchair-dock system of claim 1, wherein the actuator is a solenoid.

7. The wheelchair-dock system of claim 1, wherein the depression includes a side wall having a hole, and the member in the extended position extends through the hole.

8. The wheelchair-dock system of claim 7, wherein the member is a first member, the wheelchair-dock system including a second member movable in the lateral direction between the retracted position and the extended position over the depression.

9. The wheelchair-dock system of claim 8, wherein the side wall is a first side wall, the hole is a first hole, the depression includes a second side wall having a second hole, and the second member in the extended position extends through the second hole.

10. The wheelchair-dock system of claim 1, wherein the member includes a base member and a plurality of finger members movable in the lateral direction relative to the base member.

11. The wheelchair-dock system of claim 10, wherein the member includes a plurality of springs, each connected to the base member and one of the finger members.

12. The wheelchair-dock system of claim 11, wherein each finger member is movable relative to the base member between a relaxed position in which the corresponding spring is relaxed and a contracted position in which the corresponding spring is compressed.

13. The wheelchair-dock system of claim 1, further comprising a control module in communication with the position sensor, an inflator in communication with the control module, and an airbag fluidly connected to the inflator, wherein the control module is programmed to instruct the inflator to discharge based on the member being in an engaged position away from the retracted position.

14. The wheelchair-dock system of claim 1, further comprising a control module in communication with the position sensor, an inflator in communication with the control module, and an airbag fluidly connected to the inflator, wherein the control module is programmed to instruct the inflator to discharge more slowly than a default discharging speed.

15. The wheelchair-dock system of claim 1, wherein the floor includes a floor panel, and the depression includes a curved panel and two side walls extending from the curved panel to the floor panel.

16. The wheelchair-dock system of claim 1, wherein the depression is sized to receive a wheelchair wheel.

17. The wheelchair-dock system of claim 1, further comprising a vehicle including a passenger cabin, wherein the floor is disposed in the passenger cabin.

18. The wheelchair-dock system of claim 17, wherein the depression is positioned relative to the passenger cabin so that a wheelchair engaged with the depression is in a driver position.

19. A wheelchair-dock system comprising:
   a floor including an elongated depression;
   means for preventing movement of a wheelchair wheel in the depression; and
   means for covering the depression, wherein the means for preventing movement of the wheelchair wheel and the means for covering the depression are the same means.

20. The wheelchair-dock system of claim 19, further comprising means for reporting a status of the means for preventing movement of the wheelchair wheel and covering the depression.

* * * * *